United States Patent [19]

Miyazaki et al.

[11] Patent Number: 5,532,304
[45] Date of Patent: Jul. 2, 1996

[54] RESIN COMPOSITION FOR COATING

[75] Inventors: Nobuyuki Miyazaki; Shun-ichi Kodama; Takashi Takayanagi; Bunji Uchino, all of Kawasaki, Japan

[73] Assignee: Asahi Glass Company Ltd., Tokyo, Japan

[21] Appl. No.: 397,054

[22] PCT Filed: Jul. 14, 1994

[86] PCT No.: PCT/JP94/01155

§ 371 Date: Mar. 13, 1995

§ 102(e) Date: Mar. 13, 1995

[87] PCT Pub. No.: WO95/02645

PCT Pub. Date: Jan. 26, 1995

[30] Foreign Application Priority Data

| Jul. 14, 1993 | [JP] | Japan | 5-197017 |
| Aug. 25, 1993 | [JP] | Japan | 5-232516 |
| Mar. 30, 1994 | [JP] | Japan | 6-061412 |
| Apr. 18, 1994 | [JP] | Japan | 6-078732 |
| Apr. 26, 1994 | [JP] | Japan | 6-088939 |
| Apr. 26, 1994 | [JP] | Japan | 6-088940 |
| Apr. 28, 1994 | [JP] | Japan | 6-092206 |

[51] Int. Cl.$^6$ .................................................. C08K 5/54
[52] U.S. Cl. .................................................. 524/261
[58] Field of Search .................................................. 524/261

[56] References Cited

U.S. PATENT DOCUMENTS

| 2,645,624 | 7/1953 | Hunter | 524/261 |
| 3,575,916 | 4/1971 | Bockstie | 524/261 |
| 3,644,260 | 2/1972 | Strolle | 524/261 |
| 4,751,114 | 6/1988 | Homma et al. | 524/264 |

*Primary Examiner*—Kriellion S. Morgan
*Attorney, Agent, or Firm*—Oblon, Spivak, McClelland, Maier & Neustadt

[57] ABSTRACT

A resin composition for coating comprising a functional group-containing fluoropolymer (a), a curing agent (b) capable of crosslinking the functional group-containing fluoropolymer (a), and an oligomer (c) of a tetrafunctional hydrolyzable silane compound.

It is thereby possible to prevent formation of streak soils which form at a portion where rain water collects and runs down, such as below a window frame of a building.

9 Claims, No Drawings

1

RESIN COMPOSITION FOR COATING

TECHNICAL FIELD

The present invention relates to a resin composition for coating and an outdoor article coated therewith.

BACKGROUND ART

Heretofore, it has been common to apply surface coating such as coating to articles such as metals, inorganic materials, plastics, wood materials, papers, leathers or fibers for the purposes of their protection, imparting an artistic effect and a functional property, etc., and various coating materials have been developed.

Recently, as a coating material excellent in weather resistance, a fluoropolymer coating material is used in many cases. Such a fluoropolymer coating material shows a remarkably high weather resistance as compared with prior synthetic resin coating materials which have been used extensively. However, the antifouling property against soils deposited on its surface is of the same level as in the case of other synthetic resin coating materials, and an improvement in this respect is desired so that it can be used as a high performance commercial product.

Heretofore, to solve formation of the soils on the surface of a coated article, a composition for coating has been proposed wherein a polymer having a polyfluorinated carbon chain and a hydrophilic group, is incorporated (Japanese Unexamined Patent Publication No. 198653/1989). However, the proposed composition for coating was not adequate with respect to prevention of formation of streak-like soils (hereinafter referred to as rain streak soils) which are likely to form at a portion where rain water collects and runs down, such as below a window frame of a building, although some effects for preventing formation of spot-like soils due to rain water are observed.

DISCLOSURE OF INVENTION

The present invention has been made to solve the problems described above and provides a resin composition for coating, comprising a functional group-containing fluoropolymer (a), a curing agent (b) capable of crosslinking the functional group-containing fluoropolymer (a), and an oligomer (c) of a tetrafunctional hydrolyzable silane compound.

By applying the composition of the present invention to the portion of an outdoor article, where rain streak soils are particularly likely to form, formation of rain streak soils can be prevented excellently for a long period of time.

As the functional group-containing fluoropolymer (a) (hereinafter referred to simply as the fluoropolymer (a)), various resins may be used without any particular restriction, and the fluoropolymer (a) known as a fluoropolymer for coating obtained by copolymerizing a fluoroolefin with another copolymerizable monomer, is preferred from the viewpoint of the solubility in a solvent, the weather resistance of the coating film, the operation efficiency for coating, etc.

As the fluoroolefin, a fluoroolefin having 2 or 3 carbon atoms, such as tetrafluoroethylene, chlorotrifluoroethylene, trifluoroethylene, vinylidene fluoride, hexafluoropropylene or pentafluoropropylene, may be mentioned.

As the monomer copolymerizable with the fluoroolefin, at least one monomer selected from a vinyl ether, a vinyl ester, an allyl ether, an allyl ester, an isopropenyl ether, an isopropenyl ester, a methallyl ether, a methallyl ester, an α-olefin, an acrylic acid ester, a methacrylic acid ester, etc., may be mentioned.

Here, as an example of the vinyl ether, an alkyl vinyl ether such as ethyl vinyl ether, butyl vinyl ether, cyclohexyl vinyl ether, a fluoroalkyl vinyl ether or a perfluoro(alkyl vinyl ether) may be mentioned. As an example of the vinyl ester, a fatty acid vinyl ester such as "Veova 10" (tradename, manufactured by Shell Chemical Co.,) having a branched alkyl group, vinyl butyrate, vinyl acetate, vinyl pivalate or versatic acid vinyl ester may be mentioned.

As an example of the allyl ether, an alkyl allyl ether such as ethyl allyl ether or cyclohexyl allyl ether may be mentioned. As an example of the allyl ester, a fatty acid allyl ester such as allyl propionate or allyl acetate may be mentioned. As an example of the isopropenyl ether, an alkyl isopropenyl ether such as methyl isopropenyl ether may be mentioned. As an example of the α-olefin, ethylene, propylene or isobutylene may be mentioned.

If the copolymerized proportion of the fluoroolefin is too low, no adequate function as a weather resistant coating material can be obtained. On the other hand, if the copolymerized proportion of the fluoroolefin is too high, the solubility in a solvent tends to be low, such being undesirable. Accordingly, a resin in which a fluoroolefin is copolymerized in a proportion of from 30 to 70 mol %, more preferably from 40 to 60 mol %, to the total monomer, is preferred as the fluoropolymer (a).

As the fluoropolymer (a), a copolymer obtained by copolymerizing a fluoroolefin with the above-mentioned compound other than a fluoroolefin, is preferred from the viewpoint of the solubility in a solvent, etc. Thereamong, a vinyl ether, a vinyl ester, an allyl ether and allyl ester are particularly preferred, since they are excellent in the copolymerizability with the fluoroolefin. Further, an alkyl vinyl ether having a $C_{1-10}$ linear, branched or alicyclic alkyl group, a fatty acid vinyl ester, an alkyl allyl ether and a fatty acid allyl ester are preferred.

Since the fluoropolymer (a) has a functional group crosslinkable with a curing agent (b), in addition to the above-mentioned copolymer component, it is possible to obtain a tougher coating film. As such a functional group, an active hydrogen-containing group reactive with an isocyanate type curing agent or an aminoplast type curing agent, such as a hydroxyl group, an amino group, an amide group or a carboxyl group, may, for example, be mentioned. In addition to such groups, a functional group such as an epoxy group, a halogen or a double bond may also be mentioned.

As a method for introducing such a functional group, a method may be mentioned in which a monomer having a functional group, such as hydroxybutyl vinyl ether, hydroxybutyl allyl ether, ethylene glycol monoallyl ether, cyclohexanediol monovinyl ether, acrylic acid, methacrylic acid, crotonic acid, undecenoic acid, glycidyl vinyl ether or glycidyl allyl ether, is copolymerized.

Otherwise, it is possible to introduce a functional group by a method of introducing the functional group by modifying the copolymer such as a method of introducing a carboxylic acid group by reacting a polybasic acid anhydride such as succinic anhydride with a hydroxyl group or an epoxy group, or a method of introducing a double bond by reacting an isocyanate alkylmethacrylate.

The copolymer unit having the functional group is preferably from 5 to 20 mol % in the copolymer.

As such a fluoropolymer (a), commercial products such as Lumiflon (Asahi Glass Company Ltd.), Cefralcoat (Central Glass Co., Ltd.), Zaflon (Toagosei Chemical Industry Co. Ltd.), Zefful (Daikin Industries, Ltd), Fluonate (Dainippon Ink and Chemicals, Inc.), Fluolene (Japan Synthetic Rubber Co., Ltd.) and Kynar (Atochem) may be used.

As the curing agent (b), any curing agent may be used without any particular restriction so long as it is capable of crosslinking the fluoropolymer (a). For example, an aminoplast type curing agent, an isocyanate type curing agent, a polybasic acid type curing agent or a polyvalent amine type curing agent may be mentioned.

By crosslinking the curing agent (b) with the fluoropolymer (a), it is possible not only to obtain a cured coating film having excellent physical properties but also to prevent the oligomer (c) of a tetrafunctional hydrolyzable silane compound (hereinafter referred to simply as oligomer (c)) from reacting with the fluoropolymer (a). Thereby, the oligomer (c) orients on the surface of the coating film, and the effect for preventing formation of rain streak soils becomes more appreciable.

The above-mentioned Japanese Unexamined Patent Publication No. 198653/1989 discloses a composition aimed at improvement in resistance to scuffing and to folding, which comprises an alcohol solution of a hydrolyzate of a hydrolyzable silane compound and a hydroxyl group-containing fluoropolymer. However, it is not preferable to apply such a composition to the present invention for the following reason. Namely, this is because the alcohol in the composition reacts with the curing agent (b), particularly with an isocyanate type curing agent, therefore does not permit to obtain a good cured coating film.

When in the functional group at the curing reactive site in the fluoropolymer (a), is an active hydrogen-containing group, as the curing agent (b), at least one curing agent used for a usual acrylic coating material, selected from an aminoplast type curing agent, an isocyanate type curing agent, a polybasic acid and an acid anhydride thereof may, for example, be used.

As the aminoplast type curing agent, a methylolmelamine, a methylolguanamine or a methylol urea may, for example, be used. As the methylolmelamine, a methylolmelamine etherified with a lower alcohol, such as butylated methylolmelamine or methylated methylolmelamine or an epoxy modified methylolmelamine may, for example, be use. As the methylol urea, an alkylated methylol urea such as a methylated methylol urea or an ethylated methylol urea, may, for example, be used. When an aminoplast type curing agent is used, it is common to employ an acid catalyst to promote the crosslinking reaction.

As the isocyanate type curing agent, a polyvalent isocyanate compound or its blocked product may be mentioned. The polyvalent isocyanate compound is compound having at least two isocyanate groups, and it may be a compound having at least two isocyanate groups made of its modified product or oligomer. As the polyvalent isocyanate compound, an aliphatic polyvalent isocyanate compound such as ethylene diisocyanate, propylene diisocyanate, tetramethylene diisocyanate, hexamethylene diisocyanate, hexamethylene triisocyanate or lysine diisocyanate, an alicyclic polyvalent isocyanate compound such as isophorone diisocyanate, dicyclohexylmethane diisocyanate or diisocyanate methylcyclohexane, and a non-yellowing aromatic polyvalent isocyanate compound such as m-xylylene diisocyanate or p-xylene diisocyanate may be used.

As the modified product or oligomer of the polyvalent isocyanate compound, those which are called a urethane modified product, a urea modified product, an isocyanurate modified product, a biuret modified product, an allophanate modified product and a carbodiimide modified product, may, for example, be mentioned. Particularly preferred is, for example, an isocyanurate modified product which is a trimer, or a urethane modified product which is a reaction product with a polyhydric alcohol such as trimethylolpropane. As a preferred polyvalent isocyanate compound, a non-yellowing isocyanate such as hexamethylene diisocyanate or isophorone diisocyanate, or its blocked or oligomerized product may be mentioned.

Use of a non-blocked polyvalent isocyanate compound makes coating at site easy because it is possible to crosslink the fluoropolymer (a) at room temperature, and advantageous in coating for repair. When a polyvalent isocyanate compound is used, the crosslinking reaction may be promoted by adding a known catalyst such as dibutyltin dilaurate.

Further, as the polybasic acid, a long chain aliphatic dicarboxylic acid and an aromatic polycarboxylic acid are useful as well as an acid anhydride thereof.

The tetrafunctional hydrolyzable silane compound is a compound having four hydrolyzable groups directly bonded to a silicon atom. The oligomer (c) is the one obtained by oligomerizing this compound on condensation.

The hydrolyzable groups include, for example, alkoxy groups, alkoxyalkoxy groups, acyloxy groups, aryloxy groups, aminoxy groups, amide groups, ketoxime groups, isocyanate groups and halogen atoms. Preferred are groups having hydrogen atoms removed from hydroxyl groups of monohydric alcohols, such as alkoxy groups or alkoxyalkoxy groups. Particularly preferred are alkoxy groups, and their carbon number is preferably at most 4, particularly preferably 1 or 2.

The oligomer (c) has an oligomerization degree which does not permit formation of a gel product in the resin composition for coating. Here, the oligomerization degree represents the number of condensed molecules of the tetrafunctional hydrolyzable silane compound. The oligomer includes those having linear, branched, cyclic and network structures. It is considered usually to be the one having a linear molecular structure or a mixture of the one having a linear structure with the one having cyclic, branched or network structure. As the oligomer to be used in the present invention, not only the one having such a structure may be used alone, but also a mixture of the ones having these structure may be used.

As the preferred oligomer (c), an oligomer of a tetraalkoxysilane may be mentioned. On the assumption that it has a linear structure, it can be represented by the general formula $RO(Si(OR)_2O)_nR$.

In the general formula, n represents the oligomerization degree. An oligomer commonly available is a mixture of oligomers having different n, and the oligomerization degree is represented by the averaged n. n is preferably from 2 to 10, particularly preferably from 2 to 8. The one having n of 1 is difficult to adequately attain the desired effects for preventing formation of rain streak soils. The one having n which is too large, is not desirable for the reasons that the viscosity is so high that it is difficult to formulate and coat the resin composition for coating.

In the general formula, R may be, for example, a lower alkyl group such as a methyl group, an ethyl group, a propyl group or a butyl group. From the viewpoint of the hydrolytic and the condensational properties of the alkoxy group, an oligomer of tetramethoxysilane wherein R is a methyl group or an oligomer of tetraethoxysilane wherein R is an ethyl group is preferred. An oligomer of tetraethoxysilane is particularly preferred from the viewpoint that it is capable of providing the effects even with a small amount and capable of providing excellent effects for preventing formation of rain streak soils without bringing about deterioration of other coating film properties. Plural R in the same molecule may be different.

As the commercially available oligomer (c), MKC silicate MS 51, MS 56 or MSEP manufactured by Mitsubishi Kasei Corporation, or methyl silicate 51, ethyl silicate 40, 40T or 48 manufactured by Colcoat Co. Ltd., Orgatics SI series manufactured by Matsumoto Kosho, or ethyl silicate 40 or 45 manufactured by Tama Kagaku may, for example, be mentioned.

The degree of oligomerization of a tetrafunctional hydrolyzable silane compound such as a tetraalkoxysilane or its oligomer, may sometimes be represented by a "silica content". The "silica content" is a weight ratio of silica ($SiO_2$) formed from the compound, which is obtained by completely hydrolyzing and calcined the compound and measuring the amount of the resulting silica. Further, the "silica content" also represents the proportion of silica formed from one molecule of the compound, per molecule of the compound, and it is a value calculated by the formula [silica content (wt %)=oligomerization degree×(molecular weight of $SiO_2$)× 100/(molecular weight of the compound)].

It is possible to prevent formation of rain streak soils over a long period of time by adjusting the silica content of the oligomer of a tetramethoxysilane to a level of at least 40 wt % or adjusting the silica content of the oligomer other than the oligomer of tetramethoxysilane to a level of at least 35 wt %.

The composition of the present invention may used with a solvent which dissolves the fluoropolymer (a), the curing agent (b) and the oligomer (c). For example, an alcohol such as ethanol or isopropanol, a ketone such as methyl ethyl ketone or methyl isobutyl ketone, an ester such as butyl acetate or ethyl acetate, an aromatic solvent such as xylene or toluene, an aliphatic solvent, an ether solvent or a petroleum solvent may be mentioned. Two or more of such solvents may be used in combination. The composition of the present invention may be the one having the fluoropolymer (a), the curing agent (b) and the oligomer (c) dispersed in an organic solvent or a non-aqueous solvent.

Of course, when the curing agent (b) is a polyvalent isocyanate compound, the use of a solvent which reacts with the polyvalent isocyanate compound, such as an alcohol or water must be avoided, because the polyvalent isocyanate compound will not be enough used in the intended crosslinking of the fluoropolymer (a), and as a result, crosslinking of the fluoropolymer (a) will not be enough and thereby curing will be inadequate.

The contents of the fluoropolymer (a), the curing agent (b) and the oligomer (c) in the composition of the present invention are preferably from 0.1 to 100 parts by weight of the curing agent (b) and from 0.1 to 100 parts by weight of the oligomer (c), per 100 parts by weight of the fluoropolymer (a). If the content of the curing agent is less than 0.1 part by weight, the solvent resistance and the hardness will not be enough. On the other hand, the content exceeds 100 parts by weight, the processability and the impact resistance will be low, such being undesirable. Particularly preferred contents are from 1 to 50 parts by weight of the curing agent (b) and from 1 to 50 parts by weight of oligomer (c), per 100 parts by weight of the fluoropolymer (a).

When the fluoropolymer (a) is a hydroxyl group-containing fluoropolymer, it is preferred to use an isocyanate type curing agent in such a proportion that the amount of the isocyanate group is at least 0.8 mol per 1 mol of the hydroxyl group in the hydroxyl group-containing fluorine resin. If the amount is less than 0.8 mol, the curing of the composition for coating will be insufficient, and the solvent resistance and the like may become poor, such being undesirable. Particularly preferred is at least 1.1 mol, because the effect for preventing formation of rain streak soils enhances. The upper limit is not particularly defined. However, preferred is about 2.0, more preferred is from 1.2 to 1.6, because unreacted isocyanate groups remaining in the coating film may adversely affect the weather resistance or other properties.

When the oligomer (c) is an oligomer of tetramethoxysilane or an oligomer of tetraethoxysilane, its content is preferably from 5 to 50 parts by weight per 100 parts by weight of the fluoropolymer (a). If the content is less than 5 parts by weight, the intended effect for preventing formation of rain streak soils is low. If the content exceeds 50 parts by weight, curing of the coating film tends to be inadequate, such being undesirable.

It is more preferred to incorporate the oligomer (c) in an amount more than its incompatible point against the fluoropolymer (a). Here, the incompatible point represents "the minimum weight of the condensate (c) in relation to the weight of the fluoropolymer (a)" at which turbidity can be recognized by the method wherein a solution having the fluoropolymer (a) and the oligomer (c) dissolved in the solvent (d) is coated on a glass plate and then dried at 20° C., and the coating film is checked for turbidity.

It is considered that because incorporation of the oligomer (c) in an amount more than the incompatible point causes separation of phases of the fluoropolymer (a) and the oligomer (c), and the oligomer (c) undergoes hydrolysis in the vicinity of the surface of the coating film of the composition of the present invention formed on the surface of an outdoor article, the surface becomes hydrophilic, and formation of rain streak-like soils can be prevented more effectively. The incompatible point takes different values depending on type and condensation degree of the oligomer (c).

The present inventors believe that the effects to prevent formation of rain streak soils by the coating film formed from the resin composition for coating of the present invention is basically attributable to the hydrophilic nature and the oil repellency of the coating film surface. Oily soils in rain water will deposit along the run of rain water on the hydrophobic surface and will remain as streak soils upon drying. On the other hand, oily soils will not spread on the hydrophilic and oil repellent surface. Accordingly, the contact area between the surface and the oily soils will be small. Accordingly, adhesion of oily soils to the surface will be low, and oily soils tend to throw down together with the run of rain water.

The degrees of the hydrophobicity and the hydrophilicity of the surface can be measured by measuring the octane contact angle in water. The larger the octane contact angle in water, the higher the hydrophilicity of the surface and the higher the oil repellency. The present inventors have found that to adequately prevent formation of rain streak soils, the octane contact angle in water is preferably at least 102°. The above-mentioned resin composition for coating of the present invention is the one whereby the octane contact angle in water of a coating film formed therefrom will be at least 102°.

The present inventors have further found that there is an interrelation between the advance tension of the surface and likeliness of formation of rain streak soils, like the case of the octane contact angle. Namely, when the advance tension of the surface is smaller than 0 dyn/cm, rain streak soils are likely to form, and when it is larger than this, rain streak soils tend to hardly form. Although its effect is not certain, it is considered that when the advance tension of the surface is smaller than 0 dyn/cm, rain water is likely to run down while collecting, namely run down in the form of streaks, whereby streak-like soils form on the trace of the run of rain water, and when the advance tension of the surface is larger than 0 dyn/cm, rain water is less likely to run down while collecting, whereby rain streak-like soils is unlikely to form. Accordingly, in order to prevent formation of rain streak soils on the surface of the coated outdoor article, it is preferred that the advance tension of the surface of the thin film formed from the surface treating agent is at least 0 dyn/cm. A thin film having such an advance tension is excellent in the effects for preventing rain streak soils.

The advance tension of the surface is a tension per unit peripheral length, when a sample having a thin film formed from the surface treating agent is in contact with the water surface when it is immersed in distilled water. It is distinguished from a retreating tension which is a tension per unit peripheral length when the sample departs from the water surface when it is withdrawn from distilled water.

This advance tension can be measured by means of a dynamic contact angle measuring apparatus. Further, the advance tension is difficult to directly measure and therefore is obtained in such a manner that while immersing the sample in distilled water at 25° C. at a constant speed, measurement of the change in weight of the sample is carried out until the weight change (dyn) will become constant, and the linear line of this weight change is extrapolated to the point when the sample contacted the water surface to determine the weight change at the time when the sample has contacted the water surface, which is divided by a unit peripheral length (cm) of the sample to obtain a value of the advance tension. The present inventors have adopted a value obtained by measuring at an immersion speed of 20 mm/min, as the advance tension.

The resin composition for coating of the present invention is preferably obtained by preliminarily preparing a main agent composition (A) composed of a solution containing the fluoropolymer (a), and a curing agent composition (B) composed of a solution containing the curing agent (b) and the oligomer (c), and then mixing the main agent composition (A) and the curing agent composition (B). The composition needs no baking treatment and is excellent in efficiency at site. In this case, as the curing agent (b), the above-mentioned non-blocked isocyanate type curing agents are used.

With respect to the amounts of the curing agent (b) and the oligomer (c) in the curing agent composition (B) and the amount of the fluoropolymer (a) in the main agent composition (A), it is preferred to incorporate them into the respective compositions in such amounts that when the main agent composition (A) and the curing agent composition (B) are mixed, the above-mentioned contents are attained.

The oligomer (c) is considered to undergo hydrolysis in the vicinity of the surface of the coating film formed from the composition of the present invention on the surface of an outdoor article. A catalyst to promote this hydrolysis may be used. As such a catalyst, a metal compound catalyst such as a metal chelate, a metal ester or a metal alkoxide may be mentioned. As the metal, aluminum, titanium, silicon, tin or zinc may, for example, be mentioned. Specifically, aluminum monoacetylacetonate bis(ethylacetoacetate) or an aluminum tris(acetylacetonate) may be mentioned. Its amount is suitably from 0.1 to 20 parts by weight, preferably from 1 to 10 parts by weight, per 100 parts by weight of the oligomer (c).

The composition of the present invention may contain, in addition to the above-mentioned components, a pigment, an ultraviolet absorber, a photostabilizer, a leveling agent, a delustering agent, a surfactant, an anti-sag agent or a silane coupling agent for improvement of the adhesion of the coating film. Further, other resins for coating may be used together to such an extent not to impair the prevention of formation of rain streak soils.

It is preferred to use a silane coupling agent which is a silane compound having a hydrolyzable group and an organic group other than the hydrolyzable group bonded to the silicon atom, together with the above-mentioned oligomer (c) for preventing formation of rain streak soils, in order to improve the adhesion to the coating film.

In the present invention, the silane coupling agent means a silane compound having a hydrolyzable group as described above and an organic group other than the hydrolyzable group. The organic group other than the hydrolyzable group is bonded to a silicon atom at the terminal carbon atom. Such an organic group may be a hydrocarbon group having no functional group. However, it is preferred that at least one organic group has a functional group. As the hydrolyzable group bonded to the silicon atom, an alkoxy group is particularly preferred, but an isocyanate group is also preferred. Particularly preferred is a silane compound having two or three alkoxy groups.

In the above silane coupling agent, as the organic group other than the hydrolyzable group, it is common that one organic group having a functional group is present, and when another organic group is present, such a group is usually an organic group having no functional group, such as an alkyl group. As the functional group in the organic group having a functional group, an amino group, an epoxy group, a mercapto group or an isocyanate group may, for example, be mentioned. Particularly preferred is a silane coupling agent having an amino group or an epoxy group, since the adhesion can thereby be improved even by an addition of a small amount of the silane coupling agent. The amount of the silane coupling agent to be incorporated is suitably from 1 to 50 parts by weight, preferably from 5 to 30 parts by weight, per 100 parts by weight of the oligomer (c).

The silane coupling agent is used as incorporated in the resin composition for coating. Otherwise, it is possible to adopt a method wherein it is applied as a primer preliminarily on the surface of the outdoor article. In such a case, the silane coupling agent may directly be coated or may be dissolved in a suitable solvent such as an alcohol or water and then coated. Then, the surface treating agent is applied on this primer.

Other than the silane coupling agent, other compounds capable of providing similar effects can be used. The silane coupling agent and other adhesion-improving agents include, for example, the following compounds.

Methyltrimethoxysilane, dimethylvinylmethoxysilane, 3-glycidoxypropyltrimethoxysilane, γ-aminopropyltriethoxysilane, vinyltriethyoxysilane, γ-mercaptopropyltrimethoxysilane, γ-methacryloxypropyltrimethoxysilane, γ-isocyanatepropyltrimethoxysilane, methylsilyl triisocyanate, vinylsilyl triisocyanate, diethoxysilyl diisocyanate, dimethyldichlorosilane, trimethylchorosilane, chloromethyldimethylsilane, methyltrichlorosilane, chloromethyldimethylvinylsilane, hexamethylsilazane, cyclic silazane, N',N'-bis(trimethylsilyl)trifluoroacetamide, N-trimethylsilylacetamide, N-trimethylsilylphenylurea, bistrimethylsilylurea, dimethyltrimethylsilylamine, trimethylsilylimidazole, trimethylsilyldimethylamine, methyltriacetoxysilane, 1,3-bis(γ-aminopropyl)-1,1,3,3-tetramethyldisiloxane, 3-glycidoxypropyltrimethoxysilane, 3-glycidoxypropylmethyldimethoxysilane, 3-glycidoxypropylmethyldiethoxysilane, 2-(3,4-epoxycyclohexyl)ethyltrimethoxysilane and $CH_3Si[ON=C(CH_3)(C_2H_5)]_3$.

As commercial products, TSL 8000 series, TSL 8100 series, TSL 8300 series, TSL 9306, TSL 88 series, XC 95 series and XC 99 series, manufactured by Toshiba silicone KK, KMB 1000 series, KBE 1000 series, KBC 100 series, KBM 400, 500, 600, 700, 800 and 900 series, X-12 series, KBP 503 series, manufactured by Shin-Etsu Chemical Co. Ltd., AZ series and A series, manufactured by Nippon Unicar Co. Ltd., and silane coupling agent A series of Union Carbide, may, for example, be mentioned.

Preferred silane coupling agents include amino group-containing silane coupling agents such as γ-aminopropyltriethyoxysilane, γ-aminopropyltrimethoxysilane, γ-aminopropylmethyldimethoxysilane, N-(2-aminoethyl)-γ-aminopropyltriethoxysilane, N-(2-aminoethyl)-γ-aminopropyltrimethoxysilane and N-(2-aminoethyl)-γ-aminopropylmethyldimethoxysilane and epoxy group-containing silane coupling agents such as 3-glycidoxypropyltrimethoxysilane, 3-glycidoxypropylmethyldimethoxysilane, 3-glycidoxypropylmethyldiethoxysilane and 2-(3,4-epoxycyclohexyl)ethyltrimethoxysilane.

The material for an article having a portion where rain streak soils are likely to form, may be an inorganic material such as concrete, ALC (light weight foamed concrete), GRC (glass fiber reinforced concrete), CFRC (carbon fiber reinforced concrete), stone, slate or glass, a resin such as an acrylic resin, a polycarbonate resin, a vinyl chloride resin or a polyethylene resin, an organic material such as rubber, a metal material such as aluminum, copper, brass, titanium, iron, stainless steel, a zinc steel plate or a steel plate, or an organic-inorganic composite material such as FRP (glass fiber-reinforced synthetic resin) or CFRP (carbon fiber-reinforced synthetic resin).

The composition of the present invention may be coated directly on a substrate made of such a material, and also may be coated after a surface treatment with a primer and the like or after undercoating. With respect to a substrate to which the adhesion is insufficient when the composition of the present invention is coated thereon directly, it is preferred to coat the composition after a surface treatment such as sanding or undercoating.

The composition of the present invention is coated on, for example, a portion of the following outdoor articles where rain streak soils are likely to form, whereby formation of rain streak soils can be prevented for a long time of period. For example, the outdoor article may be a transportation equipment such as an automobile, an electric car, a helicopter, a ship, a bicycle, a snow mobile, a ropeway, a lift, a hovercraft or a motorcycle, a building part such as a sash, a shutter, a water storage tank, a door, a balcony, an external panel for building, a roof material, a staircase, a sky light or a concrete fence, an outer wall of an architectural structure, a road part such as a guardrail, a foot bridge, a sound insulating wall, a road sign, a high way road side wall, a railway bridge or a bridge, a plant equipment such as a tank, a pipe, a tower or a chimney, an agricultural equipment such as a vinyl house, a green house, a silo or an agricultural sheet, a communication installation such as a utility pole, a power transmission tower or a parabola antenna, an electrical equipment such as distributing box, an illuminating equipment, an exterior part of an air conditioner or a washing machine, as well as a covering material, a monument, a grave stone, a paving material, a wind shield sheet, a waterproof sheet and a cultivation sheet for building, etc.

The composition of the present invention may be coated by means of a conventional coating method such as brush coating, roller coating, spray coating or flow coating without any particular limitation of the coating method.

BEST MODE FOR CARRYING OUT THE INVENTION

EXAMPLE 1

To 100 parts by weight of a xylene solution of a fluoropolymer having hydroxyl groups (a copolymer of chlorotrifluoroethylene/cyclohexyl vinyl ether/ethyl vinyl ether/hydroxybutyl vinyl ether=50/15/25/10 mol %) (solid content: 60 wt %, hydroxyl value: 50), ethyl silicate 40 [a tetraethoxysilane oligomer manufactured by Colcoat Co. Ltd. (average oligomerization degree: about 5)] was added in an amount of 30 parts by weight. The resulting mixture was coated on a glass plate and then dried at 20° C. The coating film obtained was turbid. The incompatible point was when it was added in an amount of 24 parts by weight.

To 100 parts by weight of the above-mentioned fluoropolymer having hydroxyl groups, 18.5 parts by weight of Coronate HX as a curing agent (an isocyanate type curing agent, manufactured by Nippon Polyurethane Industry Co. Ltd.: cyclic trimer of hexamethylene diisocyanate), 25 parts by weight of titanium oxide as a pigment, 0.5 part by weight of dibutyltin dilaurate as a curing catalyst (a solution of it diluted 1,000 times with xylene, hereinafter referred to as dibutyltin dilaurate solution), and 30 parts by weight of ethyl silicate 40 were added and uniformly mixed to obtain a fluoropolymer coating material.

This coating material was coated on a zinc phosphate-treated aluminum plate of 15 cm×40 cm and dried at room temperature for one week to obtain a coated article. The aluminum plate was bent in half and exposed outdoors so that the upper portions would be 30° from the horizontal plane, and their lower portions would be vertical with the coated surface facing outside. With this coated article, no rain streak soils formed even upon expiration of five months of exposure.

EXAMPLE 2

To 100 parts by weight of the xylene solution of the fluoropolymer having hydroxyl groups used in Example 1, 10 parts by weight of ethyl silicate 40 was added. Then, the resulting mixture was coated on a glass plate and dried at 20° C. The coating film thus obtained was transparent.

Then, to 100 parts by weight of the xylene solution of the fluoropolymer having hydroxyl groups used in Example 1, 18.5 parts by weight of Coronate HX as a curing agent, 25 parts by weight of titanium oxide as a pigment, 0.5 part by weight of the dibutyltin dilaurate solution as a curing catalyst and 10 parts by weight of ethyl silicate 40 were added and uniformly mixed to obtain a fluoropolymer coating material.

A coated article similar to that in Example 1 was obtained by using the coating material thus obtained, and exposed outdoors in the same manner as in Example 1. As a result, with the coated material, although no rain streak soils formed even upon expiration of three months of exposure, slight rain streak soils were observed upon expiration of five months of exposure.

EXAMPLE 3

To 100 parts by weight of the xylene solution of the fluoropolymer having hydroxyl groups used in Example 1, 10 parts by weight of methyl silicate 51 [a tetramethoxysilane oligomer manufactured by Colcoat Co. Ltd. (average oligomerization degree: about 4, silica content 51 wt %)] was added. The resulting mixture was coated on a glass plate and dried at 20° C. The coating film thus obtained was turbid. The incompatible point was when it was added in an amount of 6 parts by weight.

Then, to 100 parts by weight of the xylene solution of the fluoropolymer having hydroxyl groups used in Example 1, 18.5 parts by weight of Coronate HX as a curing agent, 25 parts by weight of titanium oxide as a pigment, 0.5 part by weight of the dibutyltin dilaurate solution as a curing catalyst and 12 parts by weight of methyl silicate 51 were added and uniformly mixed to obtain a fluoropolymer coating material.

A coated article similar to that in Example 1 was obtained by using the coating material thus obtained, and exposed outdoors in the same manner as in Example 1. As a result, with the coated article, no rain streak soils formed even upon expiration of five months of exposure. The advance tension of the surface of the coated article was 2.15 dyn/cm.

EXAMPLE 4

To 100 parts by weight of the xylene solution of the fluoropolymer having hydroxyl groups used in Example 1, 18.5 parts by weight of Coronate HX as an isocyanate type curing agent, 25 parts by weight of titanium oxide as a pigment, 0.5 part by weight of the dibutyltin dilaurate solution as a curing catalyst, 12 parts by weight of methyl silicate 51 and 0.1 part by weight of aluminum monoacetylacetonate bis(ethylacetoacetate) were added and uniformly mixed to obtain a fluoropolymer coating material.

A coated article similar to that in Example 1 was obtained by using the coating material thus obtained, and exposed outdoors in the same manner as in Example 1. As a result, with the coated article, no rain streak soils formed even upon expiration of five months of exposure. The advance tension of the surface of the coated article was 13.2 dyn/cm.

After having been dried at room temperature for 7 days, the coating film was subjected to a xylene rubbing test (a test wherein the surface of the coating film was rubbed with a gauze impregnated with xylene under a load of 1 kg/cm$^2$). The coating film did not change even after rubbed 200 times or more.

EXAMPLES 5 TO 6 AND COMPARATIVE EXAMPLE 1

Coating materials were prepared so as to have the compositions shown in Table 1 and evaluated in the same manner as in Example 1. The results obtained after five months of exposure are shown in Table 1. The advance tension of the surface of the coated article of Comparative Example 1 was −4.3 dyn/cm.

EXAMPLE 7

The same evaluation as in Example 1 was conducted except that 10 parts by weight of ethyl silicate 48 [a tetraethoxysilane oligomer manufactured by Colcoat Co. Ltd. (average oligomerization degree: about 8, silica content 48 wt %)] was added instead of methyl silicate 51. As a result, no rain streak soils formed even of expiration of five months of exposure.

EXAMPLES 8 AND 9

Coating materials were prepared so as to have the compositions shown in Table 2 and evaluated in the same manner as in Example 1. The results obtained after five months of exposure are shown in Table 2.

COMPARATIVE EXAMPLE 2

A coating film was formed in the same manner as in Example 4 except that 50 parts of HAS-1 (an alcohol solution of the condensate of the products of partial hydrolysis of tetraethoxysilane, manufactured by Colcoat Co. Ltd.) was used instead of methyl silicate 51 used in Example 4. After having been dried at room temperature for 7 days, the coating film was subjected to a xylene rubbing test, and the coating film was dissolved on rubbing 20 times.

COMPARATIVE EXAMPLE 3

The same evaluation as in Example 4 was conducted except that 50 parts of ethyl silicate 28 (tetraethoxysilane monomer manufactured by Colcoat Co. Ltd., silica content about 28.8 wt %) was used instead of methyl silicate 51 used in Example 4. As a result, rain streak soils were observed after one month of exposure,

EXAMPLE 10

A composition consisting of 100 parts by weight of the xylene solution of the fluoropolymer containing hydroxyl groups used in Example 1, 25 parts by weight of titanium oxide, 75 parts by weight of xylene, 60 parts by weight of butyl acetate, 8 parts of n-butanol, 30 parts by weight of a butyrolmelamine (U-van 20 SE 60 manufactured by Mitsui Toatsu Chemical Co. Ltd., solid content: 60 wt %), 0.5 part of a curing catalyst (Nacure 5225 manufactured by Kusumoto Kasei Co. Ltd.) and 5 parts by weight of ethyl silicate 48 was coated on an aluminum plate and dried at 140° C. for 30 minutes for curing.

The test specimen was exposed outdoors in the same manner as in Example 1. As a result, no rain streak soils were observed even on expiration of five months.

EXAMPLE 11

A composition consisting of 100 parts by weight of the xylene solution of the fluoropolymer having hydroxyl groups used in Example 1, 25 parts by weight of titanium oxide, 75 parts by weight of xylene, 60 parts by weight of butyl acetate, 20 parts by weight of a blocked isocyanate (C-2507, manufactured by Nippon Polyurethane Industry Co. Ltd., a methylethylketoxime-blocked product of a cyclic trimer of hexamethylene diisocyanate, solid content: 80 wt %), 0.5 part by weight of the dibutyltin dilaurate and 10 parts of ethyl silicate, was coated on an aluminum plate and dried at 160° C. for 30 minutes for curing.

The test specimen was exposed outdoors in the same manner as in Example 1. As a result, no rain streak soils were observed even on expiration of five months.

REFERENCE EXAMPLE 1

100 parts by weight of the xylene solution of the fluoropolymer having hydroxyl groups used in Example 1 was mixed with 25 parts by weight of titanium oxide CR-95 (manufactured by Ishihara Sangyo Kaisha Ltd.) as a pigment, 0.5 part by weight of 3-glycidoxypropylmethyldimethoxysilane as a terminal epoxy group-containing silane coupling agent, 2 parts by weight of Tinuvin 1130 (manufactured by Ciba Geigy) as an ultraviolet absorber, 0.1 part by weight of CGL 123 (manufactured by Ciba Geigy) as a hindered amine type photostabilizer, 2 parts by weight of a fine silica, Aerosil T 600 (manufactured by Nippon Aerosil Co. Ltd.) as a delusting agent and 0.2 part by weight of aluminum monoacetylacetonate bis(ethylacetoacetate) as a catalyst for promotion of formation of hydroxyl groups in hydrolysis to prepare a main agent composition for a two liquid type composition for coating.

On the other hand, a curing agent composition consisting of 18 parts by weight of a trimer of hexamethylene diisocyanate, 20 parts by weight of methyl silicate 51 and 35 parts by weight of a diluting solvent composed of toluene/butyl acetate (mixing ratio=4/3) was prepared.

REFERENCE EXAMPLE 2

In the curing agent composition of reference Example 1, 50 parts by weight of ethyl silicate 40 was used instead of 20 parts by weight of methyl silicate 51.

REFERENCE EXAMPLE 3

In the curing agent composition of Reference Example 1, 20 parts by weight of methylolmelamine was used instead of 18 parts by weight of the trimer of hexamethylene diisocyanate.

REFERENCE EXAMPLE 4

In the curing agent composition of Reference Example 1, 25 parts by weight of a trimer of hexamethylene diisocyanate blocked with methyl ethyl ketoxime was used instead of 18 parts by weigh of a trimer of hexamethylene diisocyanate.

COMPARATIVE REFERENCE EXAMPLE 1

In Reference Example 1, methyl silicate 51 was added to the main agent composition, not to the curing agent composition.

COMPARATIVE REFERENCE EXAMPLE 2

In Reference Example 2, methyl silicate 40 was added to the main agent composition, not to the curing agent composition.

The results of Reference Examples 1 to 4 and Comparative Reference Examples 1 and 2 are shown in the following Table 3.

With respect to the storage stability in the Table, after 100 g of each of the main agent compositions and the curing agent compositions was placed in a sealed container at 50° C. for 30 days, the composition was brought to room temperature and checked for turbidity and solidification.

EXAMPLE 12

A coated article similar to that in Example 1 was prepared by using a coating material obtained by mixing 100 parts by weight of the main agent composition of Reference Example 1 with 35 parts by weight of the curing agent composition of Reference Example 1, and exposed outdoors in the same manner as in Example 1. As a result, with this coated article, no rain streak soils formed even upon expiration of five months of exposure.

EXAMPLE 13

A coated article similar to that in Example 1 was prepared by using a coating material obtained by mixing 100 parts by weight of the main agent composition of Reference Example 1 with 35 parts by weight of the curing agent composition of Reference Example 2, and exposed outdoors in the same manner as in Example 1. A a result, with this coated article, no rain streak soils formed even upon expiration of five months of exposure.

EXAMPLE 14

A coated article similar to that in Example 1 was prepared by using a coating material obtained by mixing 100 parts by weight of the main agent composition of Reference Example 1 with 35 parts by weight of the curing agent composition of Reference Example 3, and exposed outdoors in the same manner as in Example 1. As a result, with this coated article, no rain streak soils formed even upon expiration of five months of exposure.

EXAMPLE 15

A coated article similar to that in Example 1 was prepared by using a coating material obtained by mixing 100 parts by weight of the main agent composition of Reference Example 1 with 35 parts by weight of the curing agent composition of Reference Example 4, and exposed outdoors in the same manner as in Example 1. As a result, with this coated article, no rain streak soils formed even upon expiration of five months of exposure.

EXAMPLE 16

To 100 pats by weigh of the fluoropolymer in the fluoropolymer coating material obtained in Example 1, 0.1 part by weight of p-toluenesulfonic acid salt was added and uniformly mixed. The mixture was coated on an aluminum plate and dried at room temperature for one week for curing. The advance tension of the surface of this coated article was 1.21 dyn/cm. With the article exposed outdoors, no rain streak soils formed on expiration of five months of exposure.

TABLE 1

| | | Example 5 | Example 6 | Comparative Example 1 |
|---|---|---|---|---|
| Formulation | Xylene solution of fluoropolymer*1 | 100 | | |
| | Xylene solution of fluoropolymer*2 | | 100 | 100 |
| | Coronate HX | 18.5 | | |
| | Dibutyltin dilaurate | 0.5 | | |
| | Hexahydrophthalic anhydride | | 12 | 12 |
| | Cyclohexyldimethylamine | | | |
| | TiO$_2$ | 25 | 25 | 25 |

TABLE 1-continued

| | | Example 5 | Example 6 | Comparative Example 1 |
|---|---|---|---|---|
| | Methyl silicate 51 | 10 | 10 | 0 |
| Evaluation | Rain streak soil test formed: o not formed: X | o | o | X |

*¹Copolymer of chlorotrifluoroethylene/Veova 10 (branched alkyl group vinyl ester manufactured by Shell Chemical Co.,)/hydroxybutyl vinyl ether = 50/40/10 mol %: Solid content 60 wt %
*²Copolymer of chlorotrifluoroethylene/cyclohexyl vinyl ether/ethyl vinyl ether/glycidyl vinyl ether = 50/15/20/15 mol %: Solid content 60 wt %

TABLE 2

| | | Example 8 | Example 9 |
|---|---|---|---|
| Formulation | Xylene solution of fluoropolymer*¹ | 100 | |
| | Xylene solution of fluoropolymer*² | | 100 |
| | Coronate HX | 18.5 | |
| | Dibutyltin dilaurate | 0.5 | |
| | Hexahydrophthalic anhydride | | 12 |
| | Cyclohexyldimethylamine | | 0.3 |
| | TiO$_2$ | 25 | 25 |
| | Ethyl silicate 48 | 10 | 10 |
| Evaluation | Rain streak soil test formed: o not formed: X | o | o |

TABLE 3

| | Storage stability | |
|---|---|---|
| | Main agent composition | Curing agent composition |
| Reference Example 12 | no change | no change |
| Reference Example 13 | — | no change |
| Reference Example 14 | — | no change |
| Reference Example 15 | | no change |
| Comparative Reference Example 1 | solidified | no change |
| Comparative Reference Example 2 | solidified | no change |

INDUSTRIAL APPLICABILITY

The fluorine-containing composition for coating of the present invention has an excellent effect in keeping good appearance of outdoor articles such as an external material for building and an external panel for automobile when applied thereto, since articles coated with it are free from formation of rain streak soils.

What is claimed is:

1. A resin composition for coating, comprising a functional group-containing fluoropolymer (a), a curing agent (b) capable of crosslinking the functional group-containing fluoropolymer (a), and an oligomer (c) of a tetrafunctional hydrolyzable silane compound, wherein the curing agent (b) is of a type which prevents the oligomer (c) from reacting with the fluoropolymer (a) and wherein the functional group in fluoropolymer (a) is selected from the group consisting of hydroxyl, amino, amide, carboxyl, epoxy, halogen, and a double bond.

2. The composition according to claim 1, wherein the resin composition for coating is obtained by preliminarily preparing a main agent composition (A) composed of a solution containing the functional group-containing fluoropolymer (a), and a curing agent composition (B) composed of a solution containing the curing agent (b) and the oligomer (c), and then mixing the main agent composition (A) and the curing agent composition (B).

3. The composition according to claim 1, wherein the tetrafunctional hydrolyzable silane compound is a tetraalkoxysilane.

4. The composition according to claim 3, wherein the tetraalkoxysilane is tetramethoxysilane or tetraethoxysilane.

5. The composition according to claim 1, wherein the silica content as defined in the specification of the oligomer (c) is at least 35 wt %.

6. The composition according to claim 1, which contains the functional group-containing fluoropolymer (a), the curing agent (b) and the oligomer (c) in such proportions that the curing agent (b) is from 0.1 to 100 parts by weight and the oligomer (c) is from 0.1 to 100 parts by weight, per 100 parts by weight of the functional group-containing fluoropolymer (a).

7. The composition according to claim 1, which contains the oligomer (c) in an amount of at least an incompatible point against the functional group-containing fluoropolymer (a) as defined in the specification, relative to the functional group-containing fluoropolymer (a).

8. The composition according to claim 1, wherein the functional group-containing fluoropolymer (a) is a hydroxyl group-containing fluoropolymer, and the curing agent (b) is an isocyanate type curing agent or an aminoplast type curing agent.

9. An outdoor article coated with the composition of claim 1.

* * * * *